United States Patent
Bar Av et al.

(10) Patent No.: US 10,999,320 B2
(45) Date of Patent: May 4, 2021

(54) VELOCITY EVENT IDENTIFICATION SYSTEM

(71) Applicant: Microsoft Technology Licensing, LLC, Redmond, WA (US)

(72) Inventors: Ido Bar Av, Tel Aviv (IL); Yonatan Most, Herzliya (IL); Shai Kaplan, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 330 days.

(21) Appl. No.: 15/474,848

(22) Filed: Mar. 30, 2017

(65) Prior Publication Data
US 2018/0139232 A1 May 17, 2018

Related U.S. Application Data

(60) Provisional application No. 62/423,136, filed on Nov. 16, 2016.

(51) Int. Cl.
*H04L 29/06* (2006.01)
(52) U.S. Cl.
CPC ........ *H04L 63/1466* (2013.01); *H04L 63/10* (2013.01); *H04L 63/107* (2013.01); *H04L 63/1425* (2013.01)
(58) Field of Classification Search
USPC .................................................. 726/4; 729/4
See application file for complete search history.

(56) References Cited

U.S. PATENT DOCUMENTS

| | | | |
|---|---|---|---|
| 7,636,785 B2 | 12/2009 | Shahine et al. | |
| 7,673,793 B2 | 3/2010 | Greene et al. | |
| 7,827,411 B2* | 11/2010 | Baier Saip | G06F 21/31 380/258 |
| 7,933,946 B2 | 4/2011 | Livshits et al. | |

(Continued)

FOREIGN PATENT DOCUMENTS

| | | | |
|---|---|---|---|
| AU | 2011265479 B2 | 5/2013 | |
| CN | 102891829 A | 1/2013 | |

(Continued)

OTHER PUBLICATIONS

"International Search Report and Written Opinion Issued in PCT Application No. PCT/US2017/060732", dated Jan. 24, 2018, 15 Pages.

(Continued)

*Primary Examiner* — Kambiz Zand
*Assistant Examiner* — Aubrey H Wyszynski
(74) *Attorney, Agent, or Firm* — Dicke, Billig & Czaja, PLLC (57) ABSTRACT

A system for determining whether a velocity event is fake or real is provided. The system accesses a data store of velocity events, each of which specifies a pair of addresses that share the velocity event. For each address of the velocity events, the system sets a score for that address based on the number of addresses that share a velocity event with that address. When the score for that address satisfies an originating address criterion, the system designates that address as an originating address. The system may determine that a velocity event is real when both addresses of the velocity event are originating addresses.

20 Claims, 9 Drawing Sheets

(56) References Cited

U.S. PATENT DOCUMENTS

| | | | |
|---|---|---|---|
| 8,090,351 B2 * | 1/2012 | Klein | G07C 13/00 |
| | | | 455/411 |
| 9,098,809 B2 | 8/2015 | Kulik et al. | |
| 9,444,839 B1 | 9/2016 | Faulkner et al. | |
| 2006/0282285 A1 | 12/2006 | Helsper et al. | |
| 2010/0235909 A1 | 9/2010 | Eynon et al. | |
| 2012/0102169 A1 | 4/2012 | Yu et al. | |
| 2012/0276922 A1 | 11/2012 | Chien | |
| 2015/0371024 A1 | 12/2015 | Kim et al. | |
| 2016/0150378 A1 | 5/2016 | Cui | |
| 2017/0155652 A1 * | 6/2017 | Most | H04L 43/0876 |

FOREIGN PATENT DOCUMENTS

| | | |
|---|---|---|
| CN | 104601547 A | 5/2015 |
| CN | 105072091 A | 11/2015 |
| WO | 2013062897 A1 | 5/2013 |

OTHER PUBLICATIONS

"Real Time Analytics of Network Data", https://www.threatmetrix.com/cyber-security-software/real-time-analytics/, Retrieved on: Oct. 5, 2016, 5 pages.

"FireSIGHT System User Guide", http://www.cisco.com/c/en/us/td/docs/security/firesight/541/user-guide/FireSIGHT-System-UserGuide-v5401/AC-Events.html, Published on: Jun. 16, 2016, 39 pages.

"Office Action Issued in Chinese Patent Application No. 201780071031.8", dated Dec. 28, 2020, 13 Pages.

* cited by examiner

| iteration \ addresses | A | B | C | Scores D | E | F | G |
|---|---|---|---|---|---|---|---|
| 0 | 1.0000 | 1.0000 | 1.0000 | 1.0000 | 1.0000 | 1.0000 | 1.0000 |
| 1 | 0.0094 | 0.5000 | 0.3333 | 0.5000 | 0.3333 | 0.2500 | 0.3333 |
| 2 | 0.0189 | 0.9907 | 0.7447 | 0.9907 | 0.7940 | 0.5966 | 0.6316 |
| 3 | 0.0096 | 0.9815 | 0.6059 | 0.9815 | 0.6190 | 0.4091 | 0.4271 |
| 4 | 0.0097 | 0.9905 | 0.6960 | 0.9905 | 0.7049 | 0.4865 | 0.4963 |
| 5 | 0.0096 | 0.9904 | 0.6640 | 0.9904 | 0.6684 | 0.4523 | 0.4582 |
| 6 | 0.0096 | 0.9905 | 0.6813 | 0.9905 | 0.6840 | 0.4681 | 0.4725 |
| 7 | 0.0096 | 0.9905 | 0.6747 | 0.9905 | 0.6767 | 0.4616 | 0.4652 |
| 8 | 0.0096 | 0.9905 | 0.6780 | 0.9905 | 0.6797 | 0.4648 | 0.4681 |
| 9 | 0.0096 | 0.9905 | 0.6767 | 0.9905 | 0.6782 | 0.4635 | 0.4667 |
| 10 | 0.0096 | 0.9905 | 0.6774 | 0.9905 | 0.6788 | 0.4641 | 0.4672 |
| 11 | 0.0096 | 0.9905 | 0.6771 | 0.9905 | 0.6785 | 0.4639 | 0.4670 |
| 12 | 0.0096 | 0.9905 | 0.6772 | 0.9905 | 0.6786 | 0.4640 | 0.4671 |
| 13 | 0.0096 | 0.9905 | 0.6772 | 0.9905 | 0.6786 | 0.4640 | 0.4670 |
| 14 | 0.0096 | 0.9905 | 0.6772 | 0.9905 | 0.6786 | 0.4640 | 0.4670 |

VELOCITY EVENT IDENTIFICATION SYSTEM

CROSS-REFERENCE TO RELATED APPLICATIONS

This application claims the benefit of U.S. Provisional Patent Application No. 62/423,136 filed Nov. 16, 2016, entitled VELOCITY EVENT IDENTIFICATION SYSTEM, which is incorporated herein by reference in its entirety.

BACKGROUND

Cyber-attacks cost companies and individuals billions of dollars. A report in 2015 stated that cyber-attacks cost companies over $400 billion annually. In addition to the financial costs, cyber-attacks may result in the destruction or loss of valuable information. For example, a ransomware attack may encrypt all the data on a personal computer, including the only copy of financial documents, family photographs, electronic mail messages, and so on. If the ransom is not paid, then the data may remain encrypted forever. Even if the ransom is paid, the attacker might not provide the key to decrypt the data. Because of the high costs of cyber-attacks, companies and individuals expend considerable resources in developing and purchasing security systems as defenses to cyber-attacks. These security systems include firewall systems, antivirus systems, authentication systems, intrusion prevention systems, access control systems, and so on.

Figure 1:
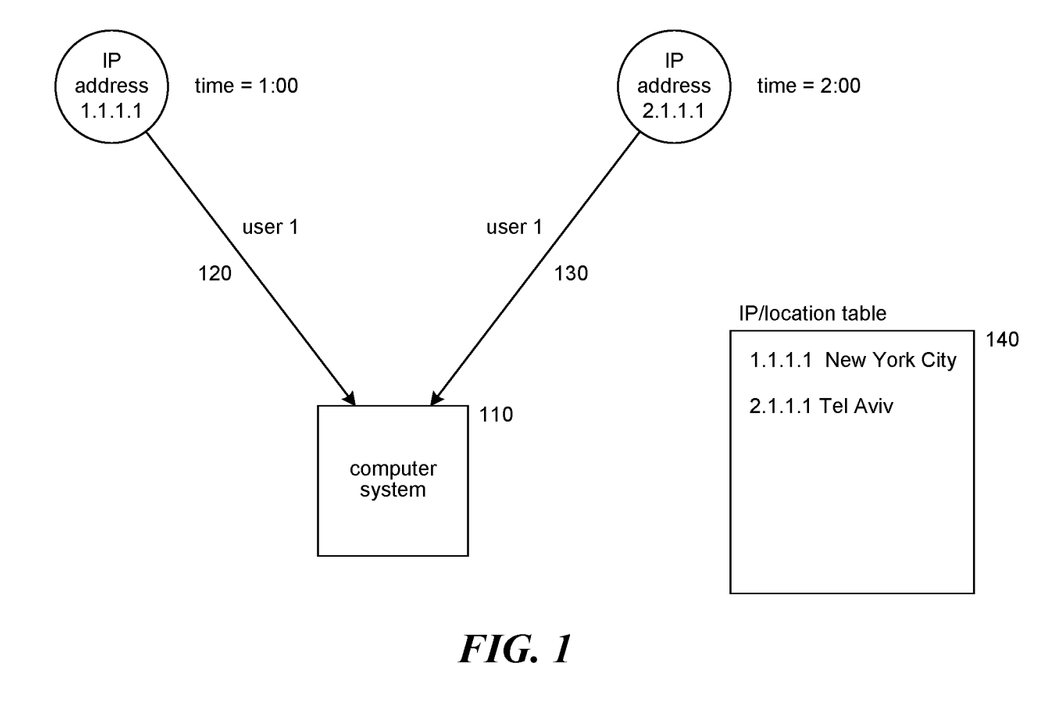
FIG. 1 illustrates an example of a velocity event.

Some defenses to a cyber-attack may rely on detecting the occurrence of a "velocity event." A velocity event, also referred to as a "velocity incident," occurs when a resource is accessed from two different locations within a period that is too short for a person to have reasonably traveled between the locations. FIG. 1 illustrates an example of a velocity event. A computer system 110 (i.e., a resource) may receive a logon request 120 for a user at 1:00 from a first Internet Protocol ("IP") address and receive another logon request 130 for the user at 2:00 from a second IP address. (An IP address that is provided to the computer system is considered to be a source IP address since it is the IP address of the computer from which the logon address was received.) An IP/location table 140 maps IP addresses to a corresponding physical address. In this example, the IP/location table maps the first address to New York City and the second address to Tel Aviv. Since the distance between New York City and Tel Aviv is over 5000 miles, it would not be possible for a person to travel from New York City to Tel Aviv within an hour. As such, the logons could not have been attempted by the same person who traveled between the locations. At least one of the logon requests may be an attempted cyber-attack by a hacker or some other unauthorized user. When such a velocity event is detected, countermeasures can be taken. The countermeasures may include locking the account of the user, requiring additional authentication (e.g., a multi-factor authentication), sending an email to alert the user, and so on.

Some velocity events may, however, be false positives in the sense that even though the IP addresses are associated with different locations, the user was not at one of the locations. Such a velocity event may be considered a fake velocity event, which is not problematic, as opposed to a real velocity event, which is problematic. A velocity event may be fake for various reasons. For example, the mappings of IP addresses to locations may not be accurate. As another example, a logon request that originates from a user's computer with one IP address may be directed through a server with a different IP address. The computer system that receives the logon request only knows that the logon request was sent from the IP address of the server. The IP address of the user's computer and the server are referred to the "originating" IP address and the "substitute" IP address, respectively. A substitute IP address may be used, for example, when the user attempts to logon to the computer system via a virtual private network ("VPN"). Thus, if a user in New York City first submits a logon request via their smartphone at 1:00 and then, while still in New York City, submits a logon request via a computer that is connected to a server in Tel Aviv at 2:00, a velocity event would be detected. The velocity event, however, would be fake.

If countermeasures were taken for every fake velocity event, considerable computer resources would be used unnecessarily. Thus, those computer resources would not be available to detect and prevent cyber-attacks. In addition, the users may consider the countermeasures (e.g., locking an account) as onerous and as placing an undue burden on the users.

SUMMARY

A system for determining whether a velocity event is fake or real is provided. In some embodiments, the system accesses a data store of velocity events, each of which specifies a pair of addresses that share the velocity event. For each address of the velocity events, the system sets a score for that address based on the number of past velocity events the address had, and the addresses that shared a velocity event with that address. When the score for that address satisfies an originating address criterion, the system designates that address as an originating address. The system may determine that a velocity event is real when both addresses of the velocity event are originating addresses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system are provided for determining whether a velocity event is real or fake. In some embodiments, a real velocity event identification ("RVEI") system processes a collection of velocity events (both real and fake) to generate a score for each unique address of the velocity events. The score for an address indicates whether the address is an originating address or a substitute address. For example, continuing with the example of FIG. 1, the score for the New York IP address would indicate that it is an originating IP address and the score for the Tel Aviv IP address would indicate that it is a substitute IP address. The scores for the addresses may range from a substitute score (e.g., 0.0) indicating a substitute address to an originating score (e.g., 1.0) indicating an originating address. The RVEI system may set a score to any value within the range based on how confident the RVEI system is that an address is a substitute or an originating address.

In some embodiments, when a velocity event is detected, the RVEI system determines whether the velocity event is real or fake based on whether the addresses of the velocity event are originating or substitute. If both addresses are originating, then the velocity event is more likely real. If, however, one of the addresses is a substitute, then the velocity event is more likely fake. To determine whether a velocity event is real or fake, the RVEI system may combine the scores of the addresses of the velocity event. For example, if the scores range from 0.0 to 1.0, the RVEI system may multiply the scores. If the combined score satisfies a real criterion (e.g., above a certain threshold), then the RVEI system designates the velocity event as real; otherwise, the RVEI designates the velocity event as fake. In this way, an attempted cyber-attack can be detected in real time and possibly thwarted, for example, by denying the later logon request and/or aborting the earlier logon request. In some embodiments, the RVEI system may use addresses (e.g., potential attacker addresses) of real velocity events to deny subsequent logon requests from those addresses even though the subsequent logon requests are not associated with a velocity event.

Although the RVEI system is described primarily in the context of logon requests to a computer account, the RVEI system may be used to detect potential cyber-attacks against a variety of resources. For example, after a user has logged on to an account, the user may attempt to access an especially sensitive document. Before access to the document is granted, the RVEI system may check whether the address is associated with a recent real velocity event, and, if so, deny access. The RVEI system may use addresses other than IP addresses. For example, a smartphone with a global positioning system ("GPS") capability may send GPS coordinates (i.e., the address) when attempting to access a resource. If the GPS coordinates of attempted accesses are too far apart (e.g., GPS coordinates provided by a smart phone and a server), then a velocity event is detected. The RVEI system may be used in combination with other techniques for processing velocity events such as those described in U.S. patent application Ser. No. 14/954,136, entitled "Technique for Detecting Unauthorized Access to Cloud Applications Based on Velocity Events," filed on Nov. 30, 2015, which is hereby incorporated by reference.

In some embodiments, the RVEI system determines whether a source address of a request is a substitute or an originating address. The RVEI system may maintain a data store of velocity events. Each velocity event specifies a pair of addresses that share that velocity event. Continuing with the example, the New York City IP address and the Tel Aviv IP address would share the same velocity event. (If there was a subsequent logon request from Tokyo at 3:00, then there would be two additional velocity events, one sharing the New York City IP address and the Tokyo IP address and one sharing the Tel Aviv IP address and the Tokyo IP address.) The RVEI system sets the score for each address of the velocity events based on the number of unique addresses that share a velocity event with that address or, alternatively, the number of velocity events that the address shares. For example, if an address corresponds to an IP address of a server through which logon requests are directed, that IP address may be in many velocity events. When the score for the address satisfies a substitute address criterion, the RVEI system designates the address as a substitute address; otherwise, it designates that address as an originating or at least potentially originating address.

Figure 2:
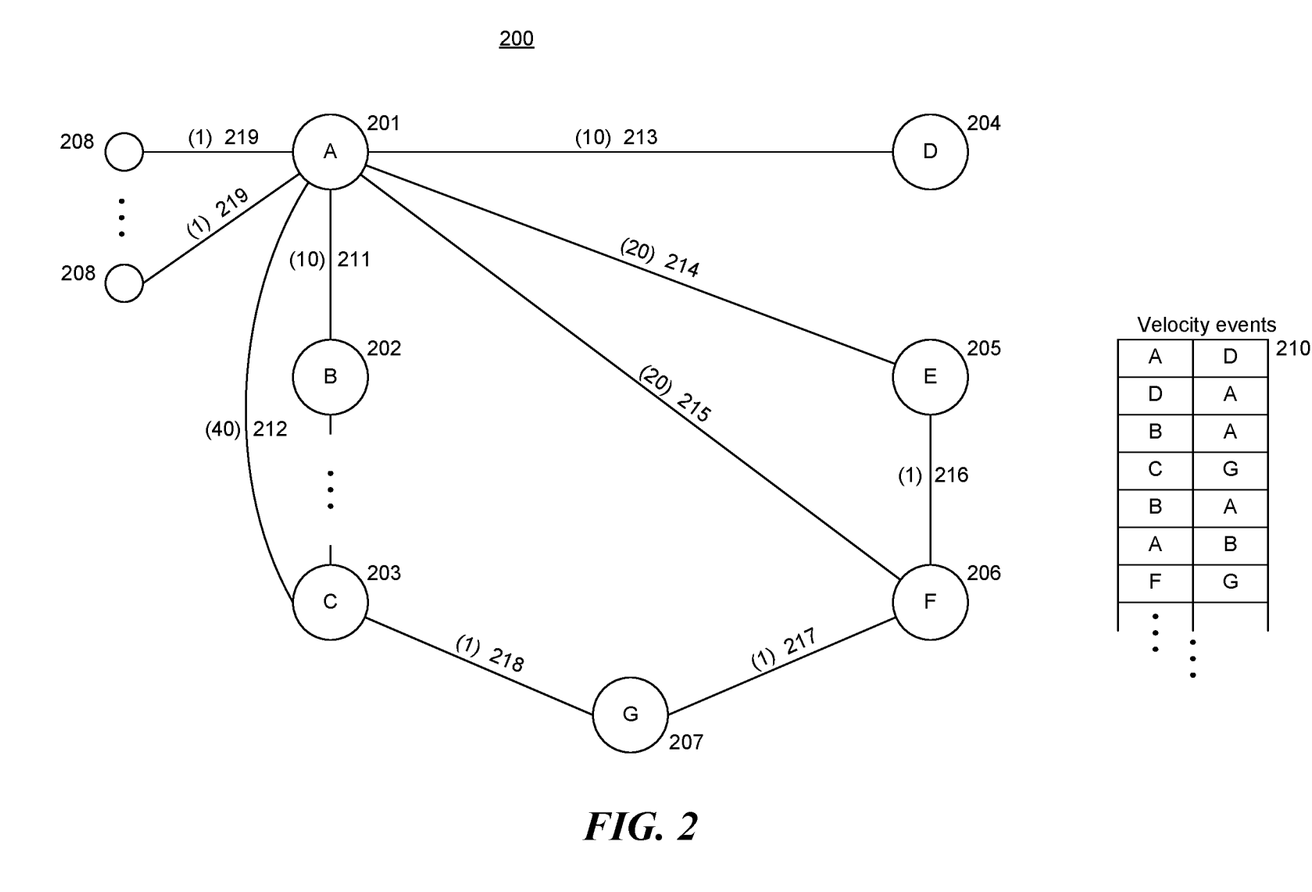
FIG. 2 is a diagram that illustrates a graph representing velocity events.

FIG. 2 is a diagram that illustrates a graph representing velocity events. A graph 100 includes nodes 201-208 that are connected via links 211-219. A velocity events table 210 includes an entry for each velocity event. Each node represents an IP address associated with a velocity event, and each link represents IP addresses that share a velocity event. For example, node 201 representing IP address A is connected to node 204 representing IP address D via link 213. The first entry of the velocity events table represents a velocity event shared by IP address A and IP address D. The numbers in the parentheses associated with each link indicate the number of velocity events that the IP addresses associated with that link share. For example, the number 10 is associated with link 213 indicating that IP address A and IP address D share 10 velocity events. Nodes 208 connected to node 201 via links 219 indicate that IP address A shares a velocity event with some number of other IP addresses. In this example, node 201 is connected to more nodes than any of the other nodes. Thus, IP address A more likely represents a substitute IP address than the other IP addresses.

In some embodiments, the RVEI system generates the scores for an IP address based on scores of the IP addresses that share a velocity event with that address. For example, the score for IP address A is based on the score of the IP addresses represented by nodes 202-206 and 208. As another example, the score for IP address G is based on the score of the IP addresses represented by nodes 203 and 206. The RVEI system may calculate the scores using an iterative process until the scores converge on a solution. The RVEI system may initially set the score of each node to 1.0. During each iteration, the RVEI system may set the score for each node as represented by the following equation:

$$S_A = \frac{1}{1 + \sum_{BB} S_{AB}}$$

where $S_A$ represents the score for IP address A, BB represents the set of adjacent IP addresses (i.e., IP addresses that share velocity events with IP address A) in the graph, and $S_{AB}$ represents the score of an adjacent IP address. When the iterations converge, the IP addresses with a score near 0.0 will tend to represent substitute IP addresses while IP addresses with a score near 1.0 will tend to represent originating IP addresses.

Figure 3:
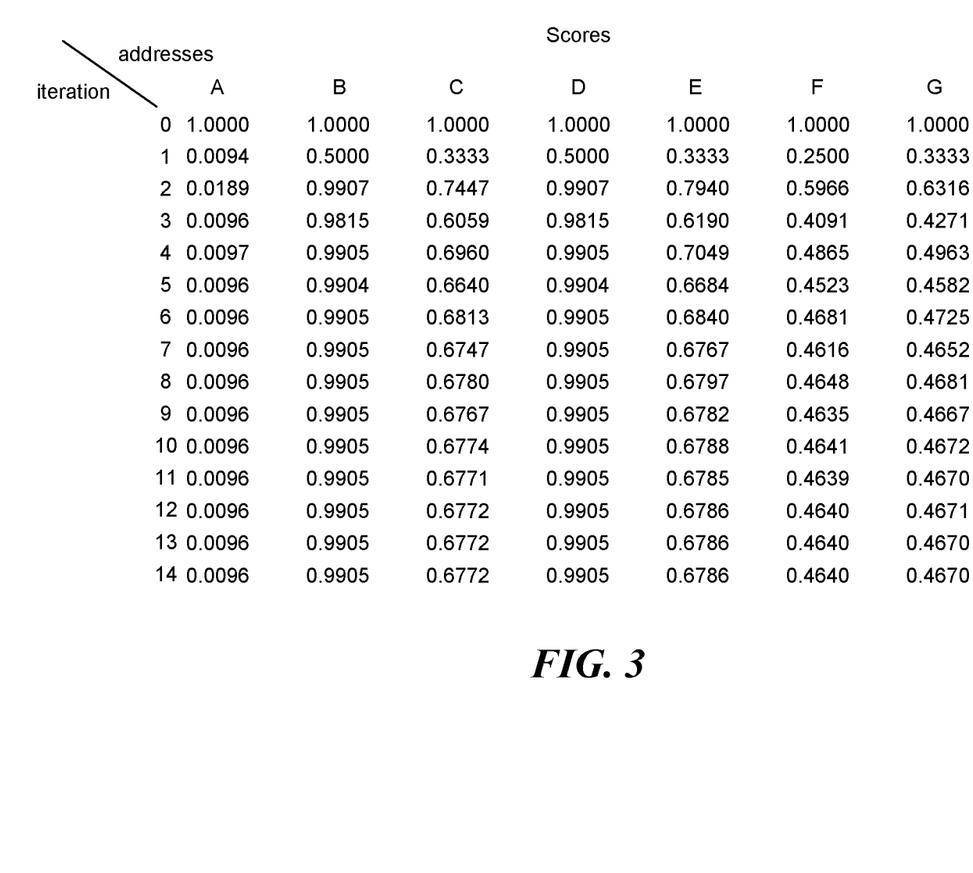
FIG. 3 is a table with results of the iterations based on the graph of FIG. 2.

FIG. 3 is a table with results of the iterations based on the graph of FIG. 2. Each column of the table represents the scores for an IP address, and each row of the table represents the scores calculated during each iteration. Although not illustrated in the table, the calculations assume that IP address A is connected to 200 other nodes 208, which are not connected to any other node. Initially, each score is set to 1.0 as illustrated by row 0. During the first iteration, the score for IP address A is set to 0.0094, which is 1 divided by 206, because node 201 is connected to 204 other nodes. Similarly, the score for IP address D is set to 0.5, which is 1 divided by 2, because node 204 is connected to one other node. As can be seen, from iteration 13 to iteration 14, the scores are the same to at least four decimal places, and the calculations may be considered to have converged on a solution. Since the score for IP address A is near zero, the RVEI system designates IP address A as a substitute IP address. The RVEI system may use a variety of algorithms for calculating the scores for the IP addresses. For example, when calculating a score for a target IP address, the scores of the IP addresses may be weighted based on the number of velocity events that each IP address shares in relation to the total number of velocity events that the target IP address shares. For example, IP address A shares 200 velocity events. Thus, when calculating the score for IP address A, the weight for the score for IP address D would be 10/200, and the weight for the score for IP address C would be 40/200. The RVEI system may also use a variety of techniques for determining convergence. For example, the scores may be determined to have converged when the average of the differences in the scores from one iteration to the next is less than a threshold average. The RVEI system may also assume convergence after some number of iterations.

Figure 4:
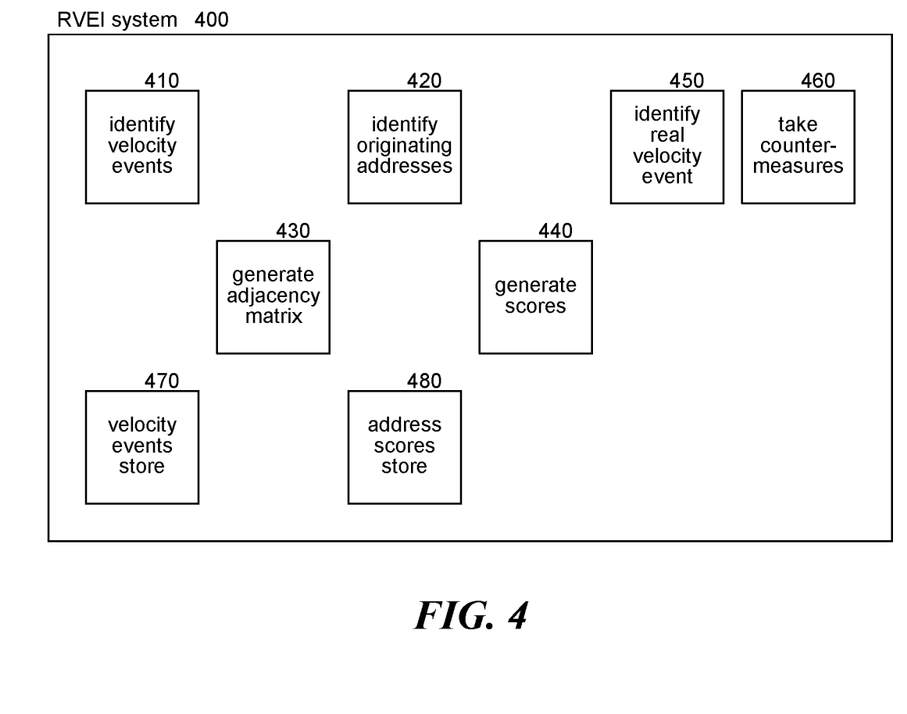
FIG. 4 is a block diagram that illustrates components of the RVEI system in some embodiments.

FIG. 4 is a block diagram that illustrates components of the RVEI system in some embodiments. The RVEI system 400 includes an identify velocity events component 410, an identify originating addresses component 420, a generate adjacency matrix component 430, a generate scores component 440, an identify real velocity event component 450, and a take countermeasures component 460. The RVEI system also includes a velocity events store 470 and an address scores store 480. The identify velocity events component identifies velocity events based on accesses to a resource by the same user at times and locations that indicate it would be unreasonable for the user to have traveled between the locations. The identify velocity events component stores the velocity events in the velocity events store. The identify originating addresses component identifies originating addresses based on the velocity events. The identify originating addresses component invokes the generate adjacency matrix component and the generate scores component. The generate adjacency matrix component generates an adjacency matrix with a row and a column for each IP address in the velocity events store. Each element of the adjacency matrix indicates whether the IP address of the row shares a velocity event with the IP address of the column. In some embodiments, the adjacency matrix may store a count of the velocity events that the IP addresses share for use in determining the weight of a score. Because the number of IP addresses may be very large, the adjacency matrix may be relatively sparse. In such a case, the RVEI system may use various well-known techniques for storing a sparse matrix. The generate scores component iteratively generates the scores for the IP addresses and stores the scores in the address scores store. The identify real velocity event component identifies whether a velocity event is real or fake. The identify real velocity event component may invoke the generate adjacency matrix component and the generate scores component. Alternatively, the identify real velocity event component may access the scores of the address scores store. The take countermeasures component is responsible for taking various countermeasures when a real velocity event is detected.

The computing systems used by the RVEI system may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the RVEI system. The data transmission media are used for transmitting data via transitory, propagating signals or carrier waves (e.g., electromagnetism) via a wired or wireless connection.

The RVEI system may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the RVEI system may be implemented in hardware using, for example, an application-specific integrated circuit (ASIC).

Figure 5:
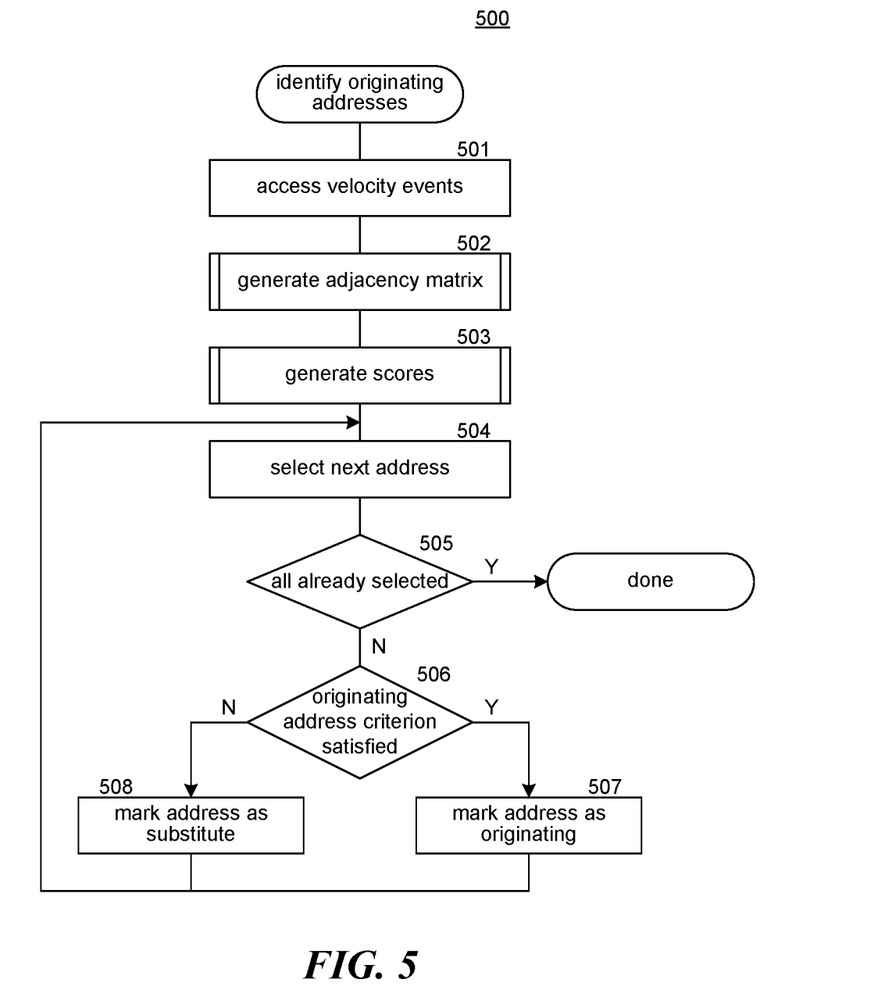
FIG. 5 is a flow diagram that illustrates processing of an identify originating addresses component of the RVEI system in some embodiments.

FIG. 5 is a flow diagram that illustrates processing of an identify originating addresses component of the RVEI system in some embodiments. The identify originating addresses component 500 identifies which addresses are likely originating addresses and which addresses are likely substitute addresses. In block 501, the component accesses a table of velocity events. In block 502, the component invokes the generate adjacency matrix component to generate the adjacency matrix for the velocity events. In block 503, the component invokes a generate scores component to generate a score for each IP address based on the adjacency matrix. In blocks 504-508, the component loops determining whether each IP address is originating or substitute. In block 504, the component selects the next IP address. In decision block 505, if all the IP addresses have already been selected, then the component completes, else the component continues at block 506. In decision block 506, if an originating address criterion is satisfied by the score of the selected IP address, then the component continues at block 507, else the component continues at block 508. In block 507, the component marks the selected IP address as an originating address and loops to block 504 to select the next IP address. In block 508, the component marks the selected IP address as a substitute address and then loops to block 504 to select the next IP address.

Figure 6:
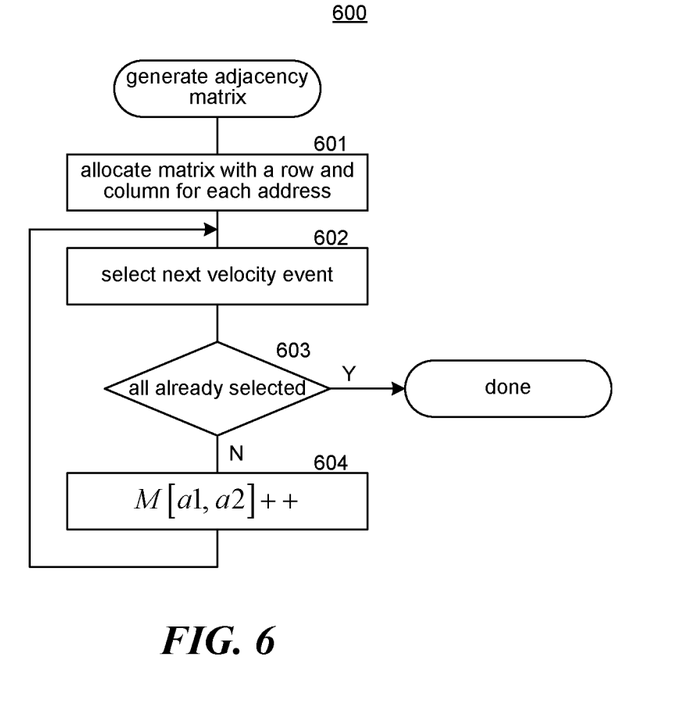
FIG. 6 is a flow diagram that illustrates processing of a generate adjacency matrix component of the RVEI system in some embodiments.

FIG. 6 is a flow diagram that illustrates the processing of a generate adjacency matrix component of the RVEI system in some embodiments. The generate adjacency matrix component 600 generates an adjacency matrix that indicates which IP addresses share velocity events. In block 601, the component allocates a matrix with a row and a column for each IP address. The adjacent matrix may be a triangular matrix. In block 602, the component selects the next velocity event. In decision block 603, if all the velocity events have already been selected, then the component completes, else the component continues at block 604. In block 604, the component increments the matrix element indexed by the IP addresses of the selected velocity event to generate a count of the velocity events that the IP addresses share. In some embodiments, the elements may contain only a one or zero rather than a count. The component then loops to block 602 to select the next velocity event.

Figure 7:
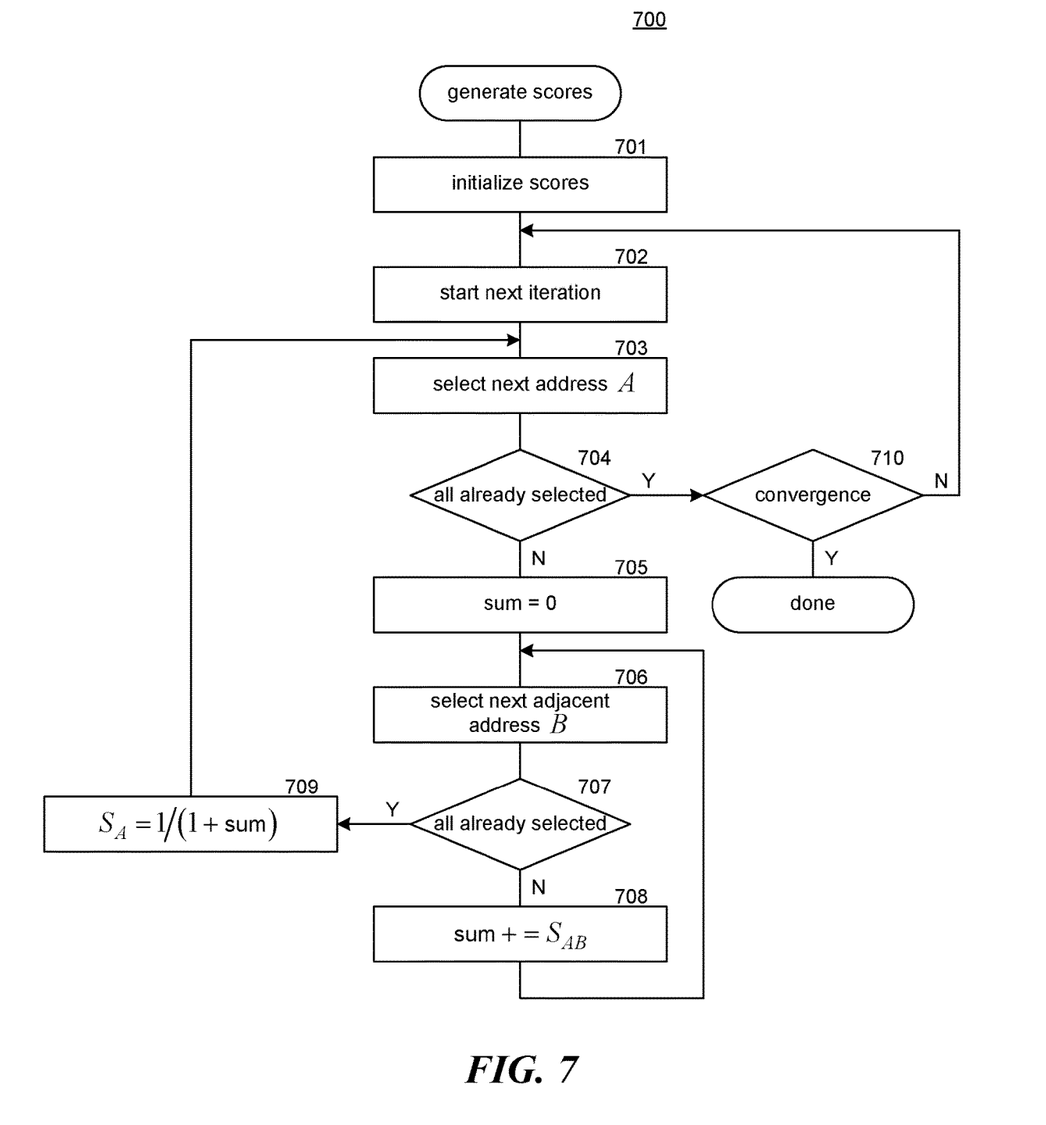
FIG. 7 is a flow diagram that illustrates the processing of a generate scores component of the RVEI system in some embodiments.

FIG. 7 is a flow diagram that illustrates the processing of a generate scores component of the RVEI system in some embodiments. The generate scores component 700 is invoked to generate the scores based on the adjacency matrix for the IP addresses of the velocity events. In block 701, the component initializes the score of each IP address. In block 702, the component selects the next iteration starting with the first. In block 703, the component selects the next IP address A. In decision block 704, if all the IP addresses have already been selected, then the component continues at block 710, else the component continues at block 705. In blocks 705-708, the component loops accumulating the scores of the IP addresses BB that are adjacent to the selected IP address A. In block 705, the component initializes the accumulated score. In block 706, the component selects the next adjacent address B. In decision block 707, if all the adjacent addresses BB have already been selected, then the component continues at block 709, else the component continues at block 708. In block 708, the component increments the accumulated score by the score of the selected adjacent IP address B and then loops to block 706 to select the next adjacent IP address B. In block 709, the component calculates the score for the selected IP address A and loops to block 703 to select the next IP address A for the current iteration. In decision block 710, if the scores of the IP addresses have converged, then the component completes, else the component loops to block 703 to start the next iteration.

Figure 8:
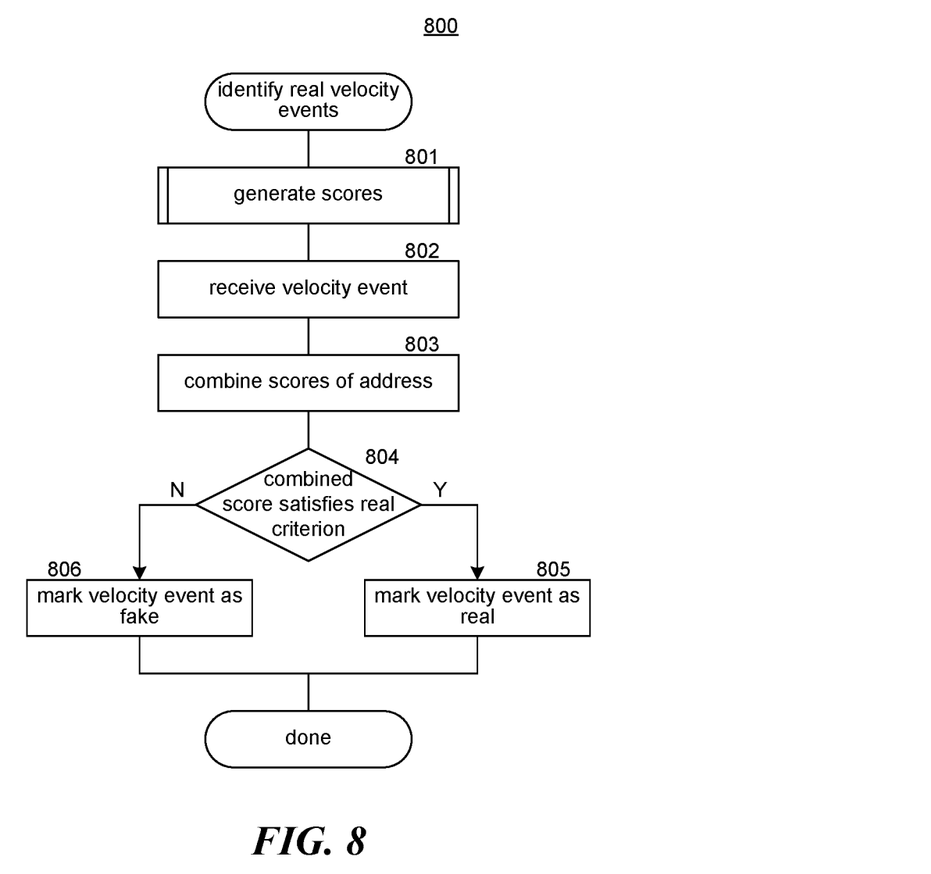
FIG. 8 is a flow diagram that illustrates the processing of a first identify real velocity events component of the RVEI system in some embodiments.

FIG. 8 is a flow diagram that illustrates the processing of a first identify real velocity events component of the RVEI system in some embodiments. The identify real velocity events component 800 generates velocity events based on a combination of the scores of the IP addresses that share the velocity event. In block 801, the component invokes the generate scores component to generate the scores for the IP addresses. In block 802, the component receives an indication of a velocity event. In block 803, the component combines the scores of the IP addresses that share the velocity event. For example, the component may multiply the scores. In decision block 804, if the combined score satisfies a real criterion (alternatively, does not satisfy a fake criterion), then the component continues at block 805, else the component continues at block 806. In block 805, the component marks the velocity event as real and completes. In block 806, the component marks the velocity event as fake and completes.

Figure 9:
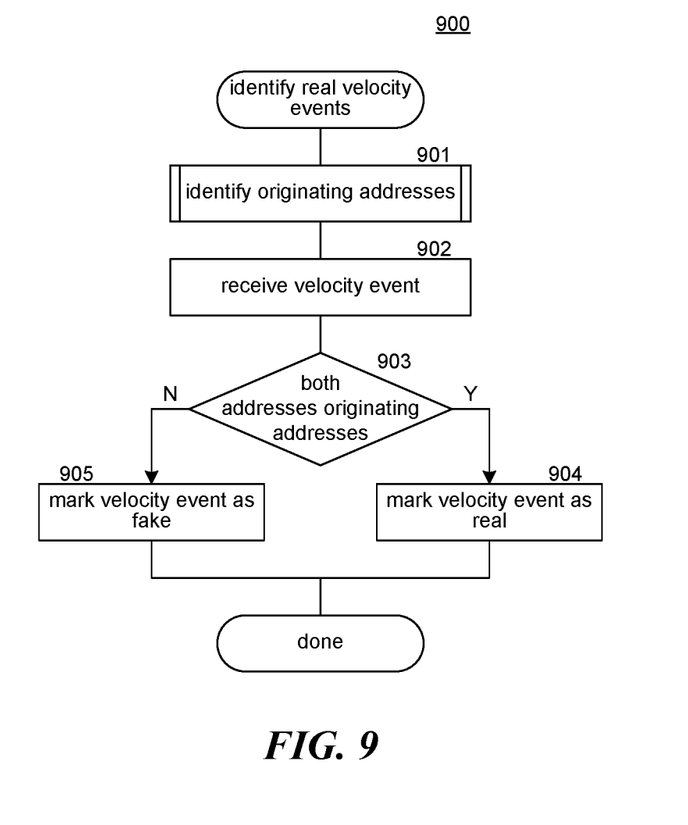
FIG. 9 is a flow diagram that illustrates the processing of a second identify real velocity events component of the RVEI system in some embodiments.

FIG. 9 is a flow diagram that illustrates the processing of a second identify real velocity events component of the RVEI system in some embodiments. An identify real velocity events component 900 generates velocity events based on a determination of whether the IP addresses have been designated as originating. In block 901, the component invokes an identify originating addresses component to identify the IP addresses of the velocity events as originating addresses. In block 902, the component receives a velocity event. In decision block 903, if both IP addresses of the velocity event are originating addresses, then the component continues at block 904, else the component continues at block 905. In block 904, the component marks the velocity event as real and completes. In block 905, the component marks the velocity event as fake and then completes.

The following paragraphs describe various embodiments of aspects of the RVEI system. An implementation of the RVEI system may employ any combination of the embodiments. The processing described below may be performed by a computing device with a processor that executes computer-executable instructions stored on a computer-readable storage medium that implements the RVEI system.

In some embodiments, a method performed by a computing device for determining whether an address is an originating address is provided. The method accesses a data store of velocity events. Each velocity event specifies a pair of addresses that share the velocity event. For each address of the velocity events, the method sets a score for that address based on the number of addresses that share a velocity event with that address. When the score for that address satisfies an originating address criterion, the method designates that address as an originating address. In some embodiments, for each address of the velocity events, when the score for the address satisfies a substitute address criterion, the method further designates the address as a substitute address. In some embodiments, the setting of the scores for the addresses comprises setting the score for each address to an initial value and iteratively resetting the score of each address based on a sum of the score of that address and the scores of the addresses that share a velocity event with that address until the scores converge on a solution. In some embodiments, the score of an address is set to an inverse of the sum. In some embodiments, the resetting of the score for an address weights the scores of each unique address that shares a velocity event with the address based on a proportion of the number of velocity events that the address and the unique address share to the number of velocity events that the address shares. In some embodiments, the method further determines whether a velocity event is real based on a combination of the scores of the addresses that share the velocity event. In some embodiments, the combination of the scores is a product of the scores. In some embodiments, each address is an address associated with an attempted access of a resource. In some embodiments, the attempted access is logging on to a computer resource. In some embodiments, a velocity event is associated with a time interval and the addresses that share a velocity event are each associated with a location and the locations are such that a person cannot have reasonably traveled between the locations during the time interval. In some embodiments, an originating address is associated with a location where a user is located and a substitute address is associated with a location other than where a user is located.

In some embodiments, a method performed by a computing device for determining whether a velocity event is real is provided. Each velocity event has a pair of addresses that share the velocity event. For each address of the velocity events, the method generates a score for the address indicating whether the address is an originating address. Upon detecting a velocity event, the method determines whether the velocity event is real based on the scores of the addresses that share the velocity event. In some embodiments, the scores are in a range of a substitute address score and an originating address score and the determining includes generating a product of the scores of the addresses that share the velocity event and indicating that the velocity event is real when the product satisfies a real velocity event criterion. In some embodiments, the score for an address is based on the number of velocity events that the address shares. In some embodiments, the higher the number of velocity events that the address shares, the less likely the address is an originating address. In some embodiments, upon determining that a velocity event is real, the method further directs a countermeasure to be taken to ensure that access of a resource via an address that shares the velocity event is an authorized access.

In some embodiments, a computing system for determining whether a velocity event is real is provided. Each velocity event has a pair of addresses. The computing system comprises a computer-readable storage medium storing computer-executable instructions and a processor for executing the computer-executable instructions stored in the computer-readable storage medium. The instructions control the computing system to access an address store that indicates addresses of velocity events are originating addresses and, upon detecting a velocity event, determine that the velocity event is real when both addresses of the velocity event are originating addresses. In some embodiments, the instructions further control the computing system to access a velocity events store storing the addresses of velocity events and, for each address of a velocity event, set a score for the address based on the number of unique addresses that share a velocity event with that address and, when the score for that address satisfies an originating address criterion, designate that address as an originating address. In some embodiments, the instructions further control the computing system to set a score for the address set the score for the address based on the scores of addresses with which the address shares a velocity event. In some embodiments, each velocity event is associated with a resource and the instructions further control the computing system to, upon determining that a velocity event is real, take a countermeasure to ensure that access to the resource associated with the velocity event is authorized.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing device for determining whether an address is an originating address, the method comprising:
    accessing a data store of velocity events, each velocity event specifying a pair of addresses that share the velocity event, velocity events occur when a resource is accessed from two different locations within a period that is too short for a person to have traveled between the locations; and
    for each address of the velocity events,
        setting a score for that address based on the number of addresses that share a velocity event with that address including iteratively resetting the score of each address until the scores converge on a solution; and
        when the score for that address satisfies an originating address criterion, designating that address as an originating address.

2. The method of claim 1 further comprising, for each address of the velocity events, when the score for the address satisfies a substitute address criterion, designating the address as a substitute address.

3. The method of claim 1 wherein the setting of the scores for the addresses comprises:
    setting the score for each address to an initial value; and
    iteratively resetting the score of each address based on a sum of the score of that address and the scores of the addresses that share a velocity event with that address until the scores converge on a solution.

4. The method of claim 3 wherein the score of an address is set to an inverse of the sum.

5. The method of claim 3 wherein the resetting of the score for an address weights the scores of each unique address that shares a velocity event with the address based on a proportion of the number of velocity events that the address and the unique address share to the number of velocity events that the address shares.

6. The method of claim 1 further comprising determining whether a velocity event is real based on a combination of the scores of the addresses that share the velocity event.

7. The method of claim 6 wherein the combination of the scores is a product of the scores.

8. The method of claim 1 wherein each address is an address associated with an attempted access of a resource.

9. The method of claim 8 wherein the attempted access is logging on to a computer resource.

10. The method of claim 1 wherein a velocity event is associated with a time interval and the addresses that share a velocity event are each associated with a location and the locations are such that a person cannot have reasonably traveled between the locations during the time interval.

11. The method of claim 1 wherein an originating address is associated with a location where a user is located and a substitute address is associated with a location other than where a user is located.

12. A method performed by a computing device for determining whether a velocity event is real, each velocity event having a pair of addresses that share the velocity event, velocity events occur when a resource is accessed from two different locations within a period that is too short for a person to have traveled between the locations, the method comprising:
    for each address of the velocity events, generating a score for the address indicating whether the address is an originating address including iteratively resetting the score of each address until the scores converge on a solution; and
    upon detecting a velocity event, determining whether the velocity event is real based on the scores of the addresses that share the velocity event.

13. The method of claim 12 wherein the scores are in a range of a substitute address score and an originating address score and the determining includes generating a product of the scores of the addresses that share the velocity event and indicating that the velocity event is real when the product satisfies a real velocity event criterion.

14. The method of claim 12 wherein the score for an address is based on the number of velocity events that the address shares.

15. The method of claim 14 wherein the higher the number of velocity events that the address shares, the less likely the address is an originating address.

16. The method of claim 12 further comprising, upon determining that a velocity event is real, directing a countermeasure to be taken to ensure that access of a resource via an address that shares the velocity event is an authorized access.

17. A computing system for determining whether a velocity event is real, each velocity event having a pair of addresses, velocity events occur when a resource is accessed from two different locations within a period that is too short for a person to have traveled between the locations, the computing system comprising:
- a computer-readable storage medium storing computer-executable instructions for controlling the computing system to:
  - for each address of a velocity event,
    - set a score for the address based on the number of unique addresses that share a velocity event with that address including iteratively resetting the score of each address until the scores converge on a solution; and
    - when the score for that address satisfies an originating address criterion, designate that address as an originating address;
  - access an address store that indicates addresses of velocity events are originating addresses; and
  - upon detecting a velocity event, determine that the velocity event is real when both addresses of the velocity event are originating addresses; and
- a processor for executing the computer-executable instructions stored in the computer-readable storage medium.

18. The computing system of claim 17 wherein the computer-executable instructions are further for controlling the computing system to:
- access a velocity events store storing the addresses of velocity events.

19. The computing system of claim 18 wherein the computer-executable instructions that control the computing system to set a score for the address set the score for the address based on the scores of addresses with which the address shares a velocity event.

20. The computing system of claim 17 wherein each velocity event is associated with a resource and wherein the computer-executable instructions are further for controlling the computing system to, upon determining that a velocity event is real, take a countermeasure to ensure that access to the resource associated with the velocity event is authorized.

* * * * *